(12) United States Patent
Singh

(10) Patent No.: US 11,449,892 B2
(45) Date of Patent: Sep. 20, 2022

(54) DETERMINING REWARDS FOR MOBILE DEVICE USERS BASED ON RENEWAL EVENTS

(71) Applicant: T-Mobile U.S.A., Inc., Bellevue, WA (US)

(72) Inventor: Manish Singh, Redmond, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/909,867

(22) Filed: Jun. 23, 2020

(65) Prior Publication Data

US 2020/0320565 A1 Oct. 8, 2020

Related U.S. Application Data

(62) Division of application No. 14/967,106, filed on Dec. 11, 2015, now abandoned.

(51) Int. Cl.
*G06Q 30/00* (2012.01)
*G06Q 30/02* (2012.01)

(52) U.S. Cl.
CPC ............................. *G06Q 30/0234* (2013.01)

(58) Field of Classification Search
None
See application file for complete search history.

(56) References Cited

U.S. PATENT DOCUMENTS

| | | | |
|---|---|---|---|
| 6,647,008 B1 | 11/2003 | Galand et al. | |
| 7,359,723 B2 | 4/2008 | Jones | |
| 2002/0078209 A1* | 6/2002 | Peng | H04L 67/101 709/227 |
| 2007/0032229 A1* | 2/2007 | Jones | G16H 10/20 455/419 |
| 2009/0089165 A1* | 4/2009 | Sweeney | G06Q 30/0226 705/14.27 |
| 2010/0085884 A1* | 4/2010 | Srinivasan | H04W 52/343 370/252 |
| 2011/0059737 A1* | 3/2011 | Brisebois | H04H 60/46 455/424 |

(Continued)

OTHER PUBLICATIONS

Published article, How to find the best no contract smartphone plans in 2015, Aug. 1, 2015, www.buyvia.com (Year: 2015).*

(Continued)

*Primary Examiner* — Naresh Vig
(74) *Attorney, Agent, or Firm* — Perkins Coie LLP

(57) ABSTRACT

Systems and methods for providing incentives to prepaid customers of mobile devices, such as customers of services for mobile devices (e.g., voice, text, and/or data services) provided by a telecommunications carrier, in order to retain these customers, are described. In some embodiments, the systems and methods include a renewal event module that accesses information associated with a renewal event performed by a mobile device customer of a current prepaid service plan, a reward determination module that determines a reward to provide to the mobile device customer in response to the a renewal event performed by the mobile device customer, and a reward provision module that provides the determined reward to the mobile device customer. Further details are described herein.

17 Claims, 7 Drawing Sheets

(56) References Cited

U.S. PATENT DOCUMENTS

| | | | |
|---|---|---|---|
| 2011/0153397 A1* | 6/2011 | Wagenheim | G06Q 30/0211 |
| | | | 705/14.13 |
| 2012/0224484 A1 | 9/2012 | Babiarz et al. | |
| 2013/0022056 A1 | 1/2013 | Crosby et al. | |
| 2014/0040001 A1 | 2/2014 | Harvey et al. | |
| 2014/0067461 A1 | 3/2014 | Zhang et al. | |
| 2015/0178701 A1* | 6/2015 | Glass | G06Q 30/0226 |
| | | | 705/14.27 |
| 2015/0254703 A1* | 9/2015 | Epner | H04M 15/8083 |
| | | | 705/14.25 |
| 2017/0169458 A1 | 6/2017 | Singh | |
| 2019/0028865 A1* | 1/2019 | Raleigh | G06Q 30/02 |

OTHER PUBLICATIONS

Hiskey, Daven. "Why a Baker's Dozen is 13 instead of 12," <www.TodayIFoundOut.com>. Sep. 7, 2010, 11 pages.
Olson, Parmy. "This App Is Cashing In On Giving The World Free Data," Aug. 17, 2015, Forbes 2015, 9 pages.
Wikipedia, "Subscription Business Model," Jun. 12, 2015, 4 pages.

* cited by examiner

DETERMINING REWARDS FOR MOBILE DEVICE USERS BASED ON RENEWAL EVENTS

CROSS-REFERENCE TO RELATED APPLICATIONS

This application is a divisional of and claims priority to U.S. patent application Ser. No. 14/967,106, filed on Dec. 11, 2015; the disclosure of which is hereby incorporated herein in its entirety by reference.

BACKGROUND

Mobile electronic devices (such as smart phones, personal digital assistants, computer tablets, and so on) are ubiquitous. Mobile devices provide advanced computing capabilities and services to users, such as voice communications, text and other messaging communications, video and other multimedia communications, streaming services, and so on. Often, users, via their mobile devices, access such services as customers or subscribers of telecommunications carriers, which provide telecommunications networks within which the users make voice calls, send text messages, send and receive data, and so on.

The telecommunications carriers may provide their customers and subscribers with various plans of service. For example, the carriers may offer and provide contractual subscription plans, where a customer is locked into an ongoing plan for a certain duration of time. As another example, the carriers may offer and provide prepaid, or non-contractual, plans, where a customer determines, during or after each segment of the plan, whether to renew and continue with the plan.

Currently, there are many carriers offering potential and current customers a variety of different varieties of both the contractual and prepaid plans of service. For example, one carrier may offer a low cost, prepaid plan, where a customer receives a basic menu of services (e.g., unlimited voice and text communications, and 1 gigabyte of data per month), as well as a higher level, and higher cost, plan, where a customer receives an enhanced or greater menu of services (e.g., unlimited voice and text communications, and 4 gigabytes of data per month), while other carriers offer similar plans and services.

BRIEF DESCRIPTION OF THE DRAWINGS

Embodiments of the present technology will be described and explained through the use of the accompanying drawings.

Figure 1:
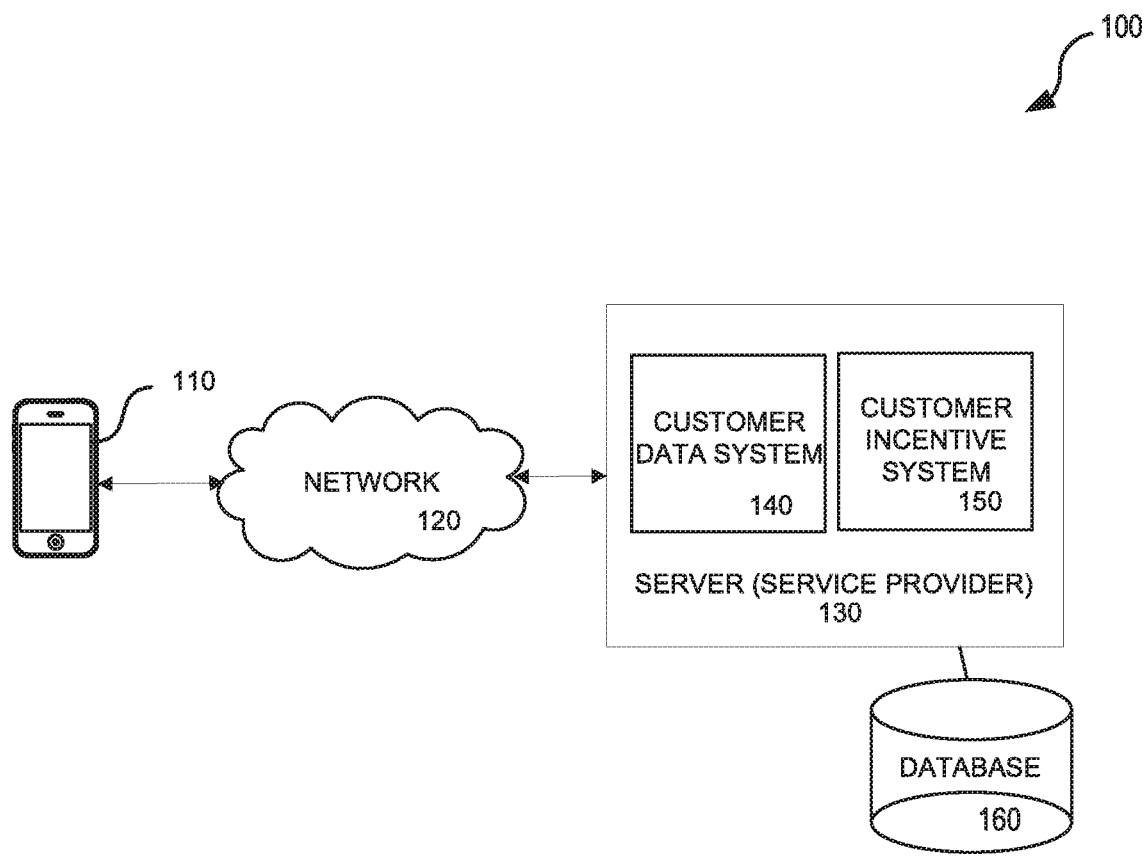
FIG. 1 is a block diagram illustrating a suitable computing environment within which to provide mobile device customers with incentives.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Systems and methods are described herein for providing incentives to prepaid customers of mobile devices, such as customers of services for mobile devices (e.g., voice, text, and/or data services) provided by a telecommunications carrier, in order to retain these customers. In some embodiments, the systems and methods include a renewal event module that accesses information associated with a renewal event performed by a mobile device customer of a current prepaid service plan, a reward determination module that determines a reward to provide to the mobile device customer in response to the renewal event performed by the mobile device customer, and a reward provision module that provides the determined reward to the mobile device customer.

For example, the systems and methods may determine a data reward to provide to a mobile device customer in response to the occurrence of the event associated with the renewal of a current prepaid service plan, such as a data reward based on an integer quotient of a total number of renewals over a number of set qualified renewals, multiplied by a predetermined amount (e.g., X number of gigabytes) of reward data.

Therefore, in some embodiments, the systems and methods determine an amount of data to provide to a mobile device customer of a prepaid service plan in a future renewal period by determining that the mobile device customer has performed a target number of renewals of a prepaid service plan under which telecommunication services are provided by a telecommunications carrier to a mobile device associated with the mobile device customer. Once the target number of renewals is reach, the systems and methods update or add to a data bucket provided to the mobile device customer under the prepaid service plan with a reward amount of data that is based on the target number of renewals of the prepaid service plan performed by the mobile device customer.

Thus, by providing customers with predetermined, targeted, and/or dynamically changing rewards and other incentives based on renewal events associated with the customers, a telecommunications carrier may reduce the churn of customers leaving, or temporarily leaving, prepaid service plans provided by the carrier. In implementing the systems and methods described herein, the carrier may convert prepaid service plan customers, which are often disloyal or disengaged to any given carrier, into loyal or engaged customers, because the carrier provides such customers with rewards for renewing the services provided by the carrier, among other benefits.

In the following description, for the purposes of explanation, numerous specific details are set forth in order to provide a thorough understanding of embodiments of the present technology. It will be apparent, however, to one skilled in the art that embodiments of the present technology may be practiced without some of these specific details.

Examples of Suitable Computing Environments

As described herein, in some embodiments, the systems and methods enable telecommunications carriers to provide predetermined, targeted rewards to customers who renew their prepaid service plans provided by the carriers. FIG. 1 is a block diagram illustrating a suitable computing environment 100 within which a telecommunications network may provide renewal incentives and/or rewards to their prepaid service plan customers/subscribers.

A user (e.g., customer or subscriber) uses his/her mobile device 110 (such as a mobile or smart phone, tablet computer, mobile media device, mobile gaming device, vehicle-based computer, wearable computing device, and so on), to access various services (e.g., voice, message, and/or data services) supported by a telecommunications network 120 that is provided by a telecommunications (wireless) carrier.

In some embodiments, the mobile device may include network communication components that enable the mobile device to communicate with remote servers or other portable electronic devices by transmitting and receiving wireless signals using a licensed, semi-licensed, or unlicensed spectrum over communications network, such as network 120. In some cases, the communication network 120 may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. The communications network 120 may also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), or other communications network.

Those skilled in the art will appreciate that various other components may be included in the mobile device 110 to enable network communication. For example, the mobile device 110 may be configured to communicate over a GSM or newer mobile telecommunications network. As a result, the mobile device 110 may include a Subscriber Identity Module (SIM) card that stores an International Mobile Subscriber Identity (IMSI) number that is used to identify the mobile device 110 on the GSM mobile or other communications networks, for example, those employing 3G and/or 4G wireless protocols. If the mobile device 110 is configured to communicate over another communications network, the mobile device 110 may include other components that enable it to be identified on the other communications networks.

In some embodiments, the mobile device 110 may include components that enable them to connect to a communications network, such as network 120, using Generic Access Network (GAN), Unlicensed Mobile Access (UMA), or LTE-U standards and protocols. For example, the mobile device 110 may include components that support Internet Protocol (IP)-based communication over a Wireless Local Area Network (WLAN) and components that enable communication with the telecommunications network over the IP-based WLAN. Further, while not shown, the mobile device 110 may include capabilities for permitting communications with satellites. The mobile device 110 may include one or more mobile applications that transfer data or check-in with remote servers and other networked components and devices.

Among other computing devices, the carrier maintains one or more servers 130 and one or more associated databases 160 that perform actions to provide service plans to customers and store information associated with their customers, the service plans they provide, associated accounting and payment systems, and so on.

For example, the server 130 may include a customer data system 140 that includes components to create, update, and store information associated with new customers of service plans provided by the carrier, current customers of service plans provided by the carrier, previous or churned customers of service plans provided by the carrier, and so on. The customer data system 140 may facilitate the engagement of new customers (e.g., via online intake sites) and may exchange information with customers when the customers sign up for service plans, renew service plans, disengage from service plans, and so on.

The server 130 also includes a customer incentive system 150 that performs various algorithmic processes to provide rewards and other incentives to customers of certain service plans provided by the carrier, such as prepaid or non-contractual service plans. In order to identify customers eligible or otherwise targeted for renewal rewards, the customer incentive system 150 may access and/or receive information from the customer data system 140 and/or the database 160, such as information that identifies the customer, information that identifies the customer's activities within the network 120, information that tracks historical preferences or attributes assigned to the customer, information that groups the customer into various groups or cohorts of customers of the carrier, and so on. The customer incentive system 150, may utilize various types of information when identifying customers for rewards and/or determine rewards and other incentives to provide to customers. As described herein, providing incentives to prepaid service plan customers may control or reduce customer churn of prepaid service plans, among other things.

FIG. 1 and the discussion herein provide a brief, general description of a suitable computing environment 100 in which the system can be supported and implemented. Although not required, aspects of the customer incentive system 150 are described in the general context of computer-executable instructions, such as routines executed by a general-purpose computer, e.g., mobile device, a server computer, or personal computer. Those skilled in the relevant art will appreciate that the system can be practiced with other communications, data processing, or computer system configurations, including: Internet appliances, hand-held devices (including tablet computers and/or personal digital assistants (PDAs)), all manner of cellular or mobile phones, multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on computer-readable media (e.g., physical and/or tangible computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the system reside on a server computer, while corresponding portions reside on a client computer such as a mobile or portable device, and thus, while certain hardware platforms are described herein, aspects of the system are equally applicable to nodes on a network. In an alternative embodiment, the mobile device or portable device may represent the server portion, while the server may represent the client portion.

Further details regarding the operation and implementation of the customer incentive system 150, will now be described.

Examples of Providing Incentives to Prepaid Customers of Mobile Devices

The customer incentive system 150 includes components that provide rewards and/or incentives to mobile device customers of prepaid service plans, such as plans provided by telecommunication and/or wireless carriers. These prepaid service plans may include non-contractual or other service plans that do not automatically renew from one payment period (e.g. a month) to the next, but instead require the customer to actively renew the service plan to continue as an active customer of the telecommunications carrier under their previous or current service plan.

Figure 2:
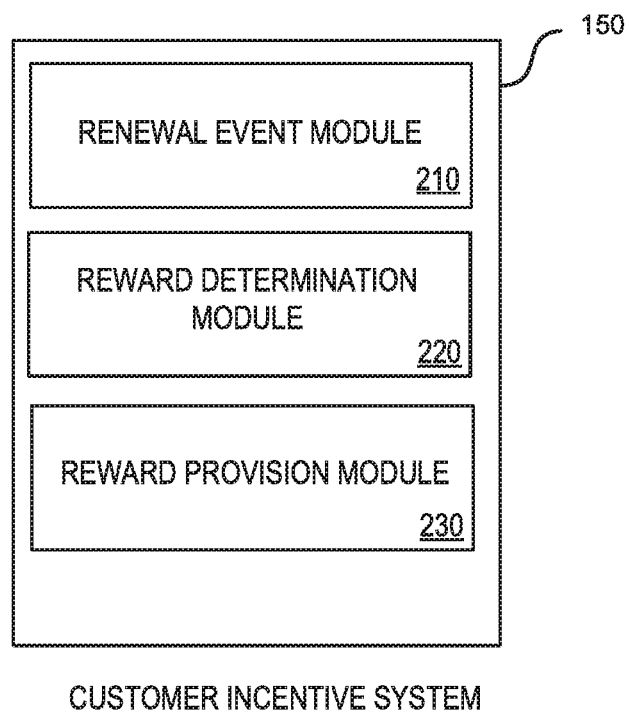
FIG. 2 is a block diagram illustrating components of a customer incentive system.

FIG. 2 is a block diagram illustrating components of the customer incentive 150. One skilled in the art will appreciate that the customer incentive system 150 may include functional modules that are implemented with a combination of software (e.g., executable instructions, or computer code) and hardware (e.g., at least a memory and processor). Accordingly, as used herein, in some examples a module is a processor-implemented module and represents a computing device having a processor that is at least temporarily configured and/or programmed by executable instructions stored in memory to perform one or more of the particular functions that are described herein. For example, the customer incentive system 150 may include a renewal event module 210, a reward determination module 220, and a reward provision module 230.

In some embodiments, the renewal event module 210 is configured and/or programmed to access information associated with a renewal event performed by a mobile device customer of a current prepaid service plan, such as a current prepaid service plan assigned to the mobile device customer by a telecommunications service provider. For example, a renewal event may be an occurrence where the customer data system 140 receives input from a customer to renew a current or previously associated prepaid service plan, such as by receiving customer input and/or payment information via a mobile application provided by the telecommunications service provider, by receiving customer input via a call center or other direct interaction with the customer, and so on.

In some embodiments, the reward determination module 220 is configured and/or programmed to determine a reward to provide to the mobile device customer in response to the a renewal event performed by the mobile device customer. The reward determination module 220 may determine the renewal is or satisfies a certain or preselected number set of qualified renewals (e.g., 2 or 3 renewals of a specific service plan, a certain number of renewals within a certain time period, and so on). For example, the reward determination module 220 may calculate or otherwise determine a reward as a value of reward data being equal to an integer quotient of a total number of renewals over the number of set qualified renewals (Q/N), multiplied by a predetermined amount (G) of reward data, or $$\text{Data to be awarded} = G(Q/N).$$

Thus, a subscriber's total data reward at any given renewal may be equal to a number of N set of qualified renewals times G data, where a data reward=number of N set of qualified renewals×G (Integer Quotient of total number of renewals on eligible plans/N×G). In some cases, a configurable limit on the maximum amount of data that can be rewarded may be applied, which may be configurable per brand and be similar for all plans within a brand.

With respect to the above formula, the reward determination module 220 may follow certain parameters or instructions when determining customer eligibility for rewards. These instructions may include:

Subscribers renew "N" number of times on eligible plans;

the renewals may be on different plans, but the plans are eligible for the renewals to be counted towards loyalty rewards;

any plans that are eligible are configurable;

the number of renewals "N" may be configurable per brand (e.g., for a specific service plan and/or level of service plan), but the same for all plans within a brand;

a subscriber may currently be on an eligible plan to receive the reward;

subscribers are rewarded "G" amount of data when they have renewed "N" times on eligible plans, when they are currently on an eligible plan, and so on, such that a subscriber's new data bucket will contain the included plan data plus "G" GBs of additional reward data; and so on.

In some cases, subscribers may receive a reward at every renewal on an eligible plan until they complete the next N renewal, where they receive another G GB of additional data reward.

The following table illustrates various examples of data rewards that are determined based on numbers of renewal events, for a subscriber on a plan that provides a standard amount of 2 GB of data, and where reward data G=1 and N=3:

TABLE 1

| Total # of Renewals | Integer Quotient of Total # of renewals/N | Data Reward | Total data = Plan data + reward data |
|---|---|---|---|
| 3 | 1 | 1 × G = 1 | 2 + 1 = 3 |
| 4 | 1 | 1 × G = 1 | 2 + 1 = 3 |
| 6 | 2 | 2 × G = 2 | 2 + 2 = 4 |
| 7 | 2 | 2 × G = 2 | 2 + 2 = 4 |
| 9 | 3 | 3 × G = 3 | 2 + 3 = 5 |

The reward determination module 220, in some cases, may determine certain patterns associated with customer renewals (or, predicted renewals), and determine whether a subsequent renewal is a qualified renewal based on an identification of these patterns within the mobile device customer's activities on the network 120 (as stored within the database 160). For example, the reward determination module 220 may determine that a reward is to be provided, or a type of reward to provide, to a customer based on an identified pattern of activities performed by the mobile device customer that are associated with a likely renewal of the current prepaid service plan, based on an analysis of renewal activities over a predetermined time period for all mobile device customers of the current prepaid service plan, and so on.

In some embodiments, the reward provision module 230 is configured and/or programmed to provide the determined reward to the mobile device customer. For example, the reward provision module 230 may adjust and/or modify a customer's current or subsequent service plan with an additional data bucket, such as a set amount of additional data (e.g., 1 GB, 2 GB, and so on), a certain additional percentage of data (e.g., 25% more data, 10% more data, and so on), an additional amount of data or unlimited use for certain mobile device applications often used by the customer (e.g., an extra 1 GB of data for streaming music to a mobile device), or other similar service or functionality or rewards (e.g., unlimited international calling, additional messaging, free apps/music/content, and so on).

Figure 3:
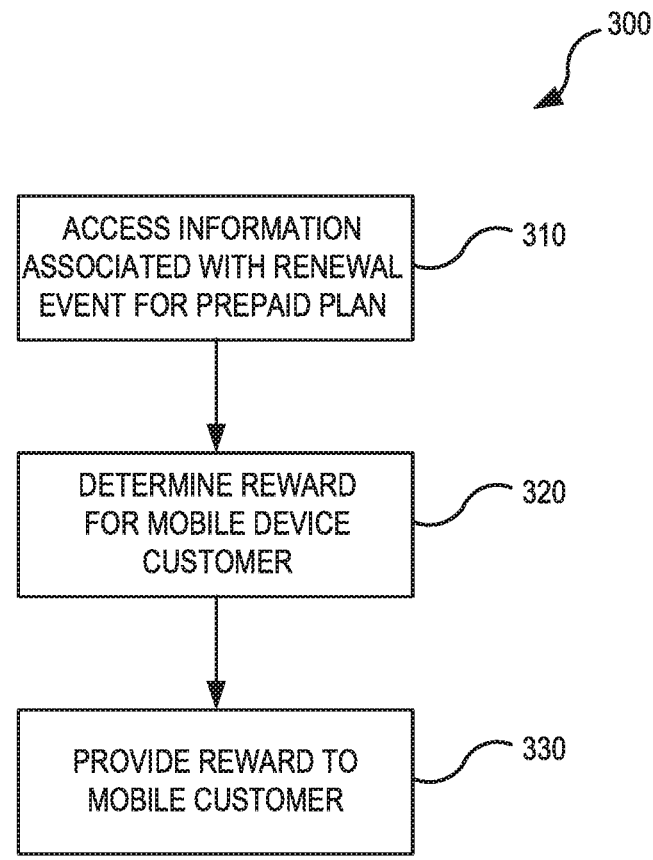
FIG. 3 is a flow diagram illustrating a method for providing an incentive to a mobile device customer.

As described herein, in some embodiments, the customer incentive system 150 performs various algorithmic processes or methods in order to provide incentives to users/customers/subscribers of prepaid mobile device service plans, in order to reduce the churn of users/customers/subscribers from these types of service plans, among other things. FIG. 3 is a flow diagram illustrating a method 300 for providing an incentive to a mobile device customer. The method 300 may be performed by the customer incentive system 150 and, accordingly, is described herein merely by way of reference thereto. It will be appreciated that the method 300 may be performed on any suitable hardware.

In operation 310, the customer incentive system 150 receives an indication of an occurrence of an event associated with a renewal of a current prepaid service plan. For example, the renewal event module 210 may access information associated with an occurrence where the customer data system 140, e.g., receives input from a customer to renew a current or previously associated prepaid service plan. This may occur by receiving customer input and/or payment information via a mobile application provided by the telecommunications service provider, by receiving customer input via a call center or other direct interaction with the customer, and so on. The input may also occur automatically, e.g., when the subscriber's account falls below a threshold, such as only 100 MB of data or 15 minutes o voice calling remaining in the prepaid plan.

In some cases, the customer incentive system 150 may provide and/or display information associated with possible rewards during predetermined or selected time periods within a currently running service period, in order to target mobile device customers with such information during time periods when they are predicted to renew a current prepaid service plan. For example, the renewal event module 210 may:

identify a historical time window within which the mobile device customer previously renewed the current prepaid service plan (e.g., 5 days from the end of the current plan, 1 day from the end of the current plan, and so on), and cause a user interface of the mobile device 110 associated with the mobile device customer to present information to the mobile device customer about the data reward in response to a subsequent renewal of the current prepaid service plan;

identify a historical time window within which other mobile device customers of the current prepaid service plan previously renewed the current prepaid service plan (e.g., the Monday before the end of the current plan, after the 15th of any month, and so on), and cause a user interface of a mobile device associated with the mobile device customer to present information to the mobile device customer about the data reward in response to a subsequent renewal of the current prepaid service plan;

identify a pattern of activities performed by the mobile device customer that are associated with a likely renewal of the current prepaid service plan (e.g., after a certain amount of data has been used within a certain time period), and cause a user interface of a mobile device associated with the mobile device customer to present information to the mobile device customer about the data reward in response to a subsequent renewal of the current prepaid service plan; and so on.

The customer incentive system 150 may consider other event occurrences as renewal events. For example, the customer incentive system 150 mat determine events associated with a customer's behavior (anniversary on plan or using a certain level of service) on a service plan, events associated with holidays or other commonly-shared observances, and so on, as renewal events.

In operation 320, the customer incentive system 150 determines a reward to provide to the mobile device customer in response to the occurrence of the event associated with the renewal of the current prepaid service plan. For example, the customer incentive system 150 determines a data reward as a value of reward data equal to an integer quotient of a total number of renewals over the number of set qualified renewals (Q/N), multiplied by a predetermined amount (G) of reward data.

Figure 4:
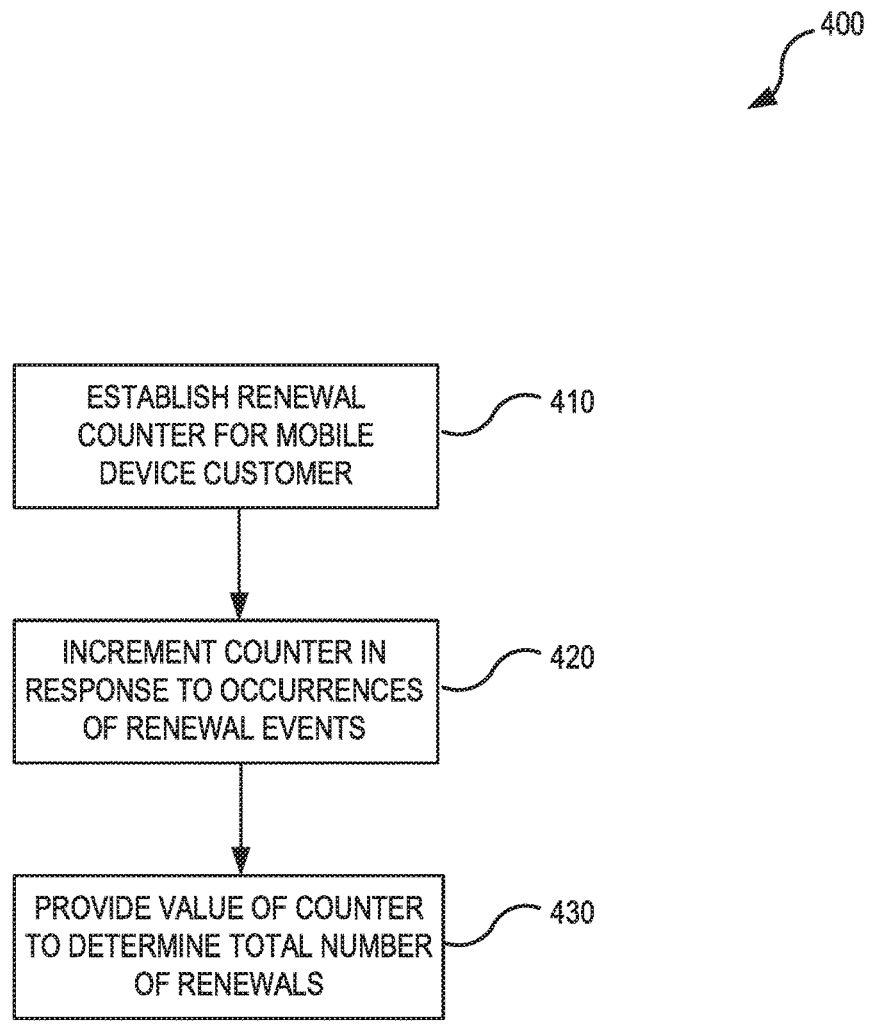
FIG. 4 is a flow diagram illustrating a method for determining an incentive to provide to a mobile device customer.

In some embodiments, the customer incentive system 150 may generate and maintain renewal counters for prepaid service plan customers, storing the counter information in database 160, and utilize the counters when determining whether the renewal event is a qualified renewal event. FIG. 4 is a flow diagram illustrating a method 400 for determining an incentive to provide to a mobile device customer. FIG. 3 is a flow diagram illustrating a method 300 for providing an incentive to a mobile device customer. The method 400 may be performed by the customer incentive system 150 and, accordingly, is described herein merely by way of reference thereto. It will be appreciated that the method 400 may be performed on any suitable hardware.

In operation 410, the customer incentive system 150 establishes a renewal counter for the mobile device customer that tracks a number of renewals of the current prepaid service plan and the number of renewals of equivalent prepaid service plans provided by the telecommunications service provider.

In operation 420, the customer incentive system 150 increments the renewal counter for the mobile device customer in response to occurrences of events associated with the renewals of the current prepaid service plan and events associated with renewals of equivalent prepaid service plans provided by the telecommunications service provider.

In operation 430, the customer incentive system 150 provides the value of the renewal counter as the total number of renewals for the data reward, which is then determined by the reward determination module 220. Thus, the customer incentive system 150 may utilize a counter or other similar mechanism, in order to track and/or confirm renewal events, qualified renewals, and so on, for mobile device customers of prepaid service plans.

Figures 5A, 5B:
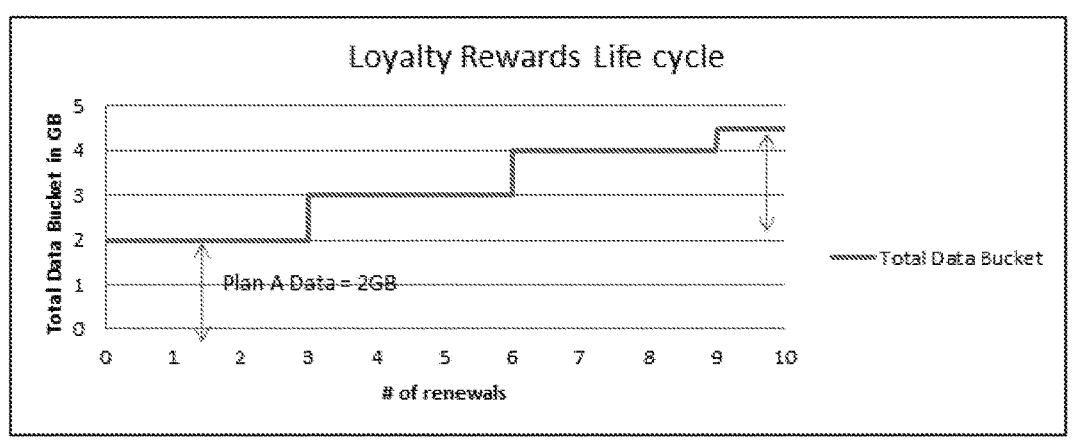
FIGS. 5A to 5B are graphs illustrating relationships between renewal events and data rewards determined for mobile device customers.

The following is an example implementation, illustrated in the graphs of FIGS. 5A and 5B, of the counter and data rewards provided to a subscriber, given a customer with a GSM activation kit, having the following renewal reward predetermined parameters: Required # of renewals for reward, N=3 [Brand Level], Amount of data reward=1 GB [Brand Level], Plan A and B eligible for data reward, Plan C not eligible for data reward, and Max Reward Limit=2.5 GB.

The subscriber activates in paid status on an eligible plan, Plan A. The customer incentive system 150 sets a renewal counter to 0 (If customer activated on an ineligible plan, Plan C, the counter is left blank). The subscriber completes first renewal on Plan A. The system 150 increments counter by 1. The subscriber completes 2nd renewal on plan A. The system 150 increments counter to 2. The subscriber completes 3rd renewal on Plan A. The system 150 increments counter to 3, and finds that subscriber is eligible for reward (see FIG. 5A). The system 150 rewards 1 GB of data to the subscriber, and the subscriber's new data bucket=Plan A included data+1 GB of additional data, where the reward data matches the technology and speed of plan A data.

The subscriber completes 4th renewal on Plan A. The system 150 sets counter to 4, and the subscriber's data bucket=Plan A included data bucket+1 GB. Later, the subscriber completes 6th renewal on Plan A, and the system 150 sets counter to 6. The system 150 finds that subscriber is eligible for another increment of 1 GB. System provisions new data bucket=(Plan A included data+1)+1 GB (2 GB of additional data from the plan).

Later, the subscriber completes 9th renewal on plan A, and the system 150 sets counter to 9. The subscriber is eligible for another 1 GB of increment, but the system 150 determines that total reward 3 GB>Max Reward Limit of 2.5 GB (see FIG. 5B). The system 150 sets the total reward to the Max Limit 2.5 GB, and the new data bucket=Plan A included data+2.5 GB (because the Total data reward<=Max Limit).

As another example, if the subscriber completes the 1st renewal on a different, but eligible plan, Plan B, the system 150 increments counter by 1, but if the subscriber completes 1st renewal on a different, but ineligible plan (e.g., a lower capacity data plan, Plan C, the system 150 does not increment counter, and the counter remains at 0.

As another example, if the subscriber completes 3rd renewal on a different, but eligible plan, Plan B, the system 150 increments counter to 3, and finds that subscriber is eligible for reward. The system 150 rewards 1 GB of data to the subscriber, and the subscriber's new data bucket=Plan B included data+1 GB. However, if the subscriber completes 3rd renewal on a different, but ineligible plan, Plan C, the system 150 does not increment counter, and the counter stays at 2, where the system determines that the subscriber is not yet eligible for reward.

As described herein, the number of qualified renewals may be based on a variety of predetermined or dynamically determined factors, such as:
- a level and type of the current prepaid service plan;
- attributes assigned to the mobile device customer (e.g., any biographical information known about the customer, location of the mobile device customer, and so on);
- attributes assigned to a set of customers of which the mobile device customer has been grouped (e.g., customers on similar service plans, customers that started or renewed a plan with similar time period or during certain promotions, and so on);
- historical renewal activities of the mobile device customer;
- an analysis of renewal activities over a predetermined time period for all mobile device customers of the current prepaid service plan (e.g., patterns associated with previous or current renewals of a current service plan, such as patterns that indicate customer churn is decreasing or increasing); and so on.

In addition, the predetermined amount of reward data may be based on a variety of predetermined or dynamically determined factors, such as:
- an analysis of renewal activities over a predetermined time period for all mobile device customers of the current prepaid service plan (e.g., patterns associated with previous or current renewals of a current service plan, such as patterns that indicate customer churn is decreasing or increasing);
- a predicted renewal probability for mobile device customers of the current prepaid service plan;
- a predicted renewal probability for a specific mobile device customer of the current prepaid service plan;
- a predicted churn probability for mobile device customers of the current prepaid service plan over a certain time period;
- a predicted churn probability for a specific mobile device customer of the current prepaid service plan over a certain time period;
- a comparison of the current prepaid service plan to prepaid service plans provided by other telecommunications carriers; and so on.

Referring back to FIG. 3, in operation 330, the customer incentive system 150 provides the determined data reward to the mobile device customer. For example, the reward provision module 230 may adjust and/or modify a customer's current or subsequent service plan with an additional data bucket, such as a set amount of additional data (e.g., 1 GB, 2 GB, and so on), a certain additional percentage of data (e.g., 25% more data, 50% more data, and so on), an additional amount of data or unlimited use for certain mobile device applications often used by the customer (e.g., an extra 1 GB of data for streaming music to a mobile device), or other similar rewards (e.g., unlimited international calling, additional messaging, and so on).

In some embodiments, the reward provision module 230 may provide a data reward to a mobile device customer during various different reward periods, such as during a renewal period associated with the renewal of the current prepaid service plan (e.g., in the subsequent prepaid month), during and/or immediately after the occurrence of the event associated with the renewal of the current prepaid service plan (e.g., before the ending of a current prepaid month or end of prepaid amount of voice/data), and so on.

As described herein, the customer incentive system 150 may render, or cause to be rendered, various user interfaces associated with the renewal of prepaid service plan and the provision of rewards and other incentives in response to qualified renewals from mobile device customers.

Figure 6A:
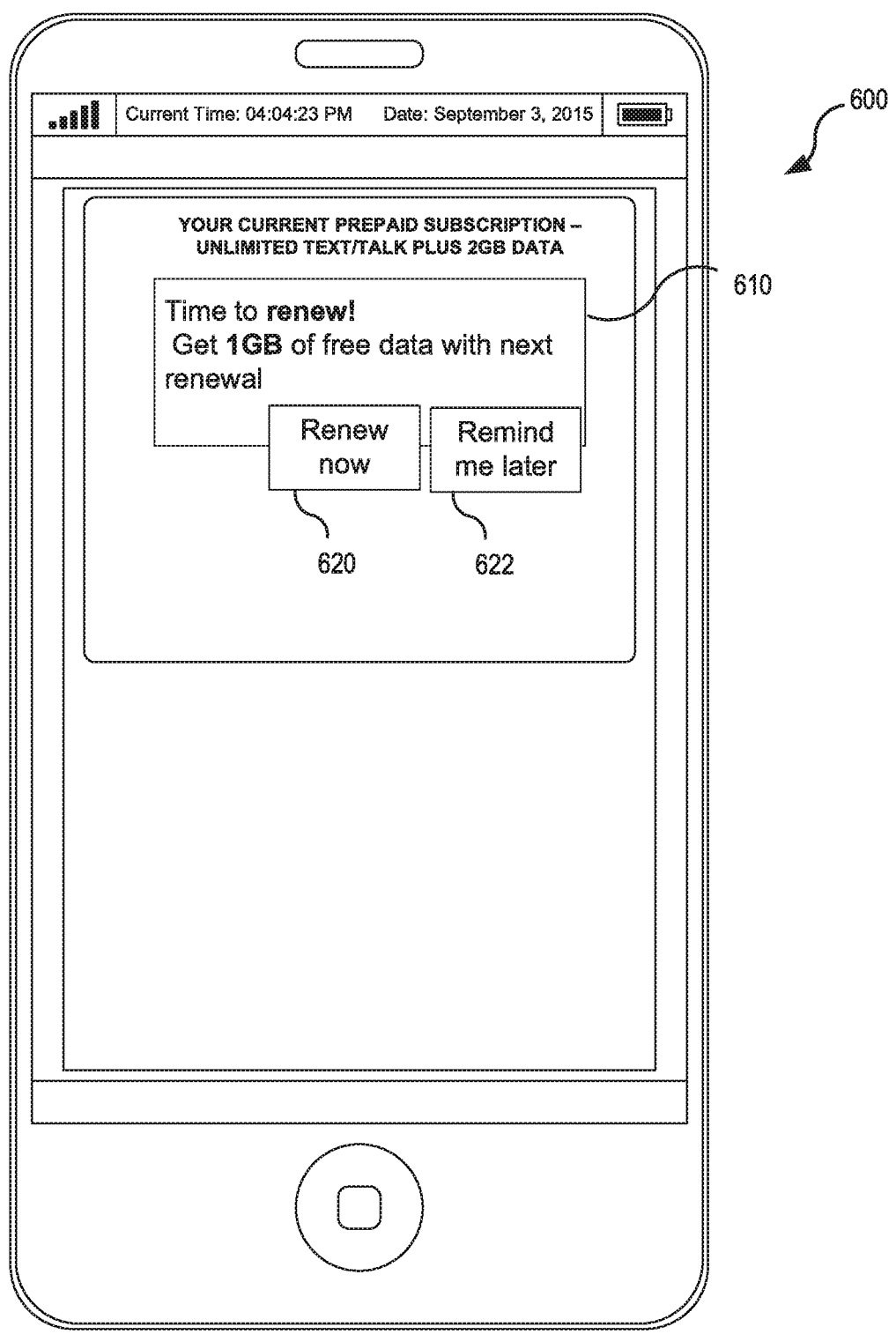
FIGS. 6A to 6B are display diagrams illustrating example user interfaces presented by the customer incentive system.

FIG. 6A depicts an example display 600, where the customer incentive system 150, in response to a trigger or other determination, causes the mobile device 110 to display information 610 associated with a data reward to be provided to the customer associated with the mobile device 110, along with user-selectable display elements (e.g., "renew now" 620, "remind me later" 622), that, when selected by the customer, facilitate the renewal of a current prepaid service plan, including a renewal reward (e.g., reward of additional data).

Figure 6B:
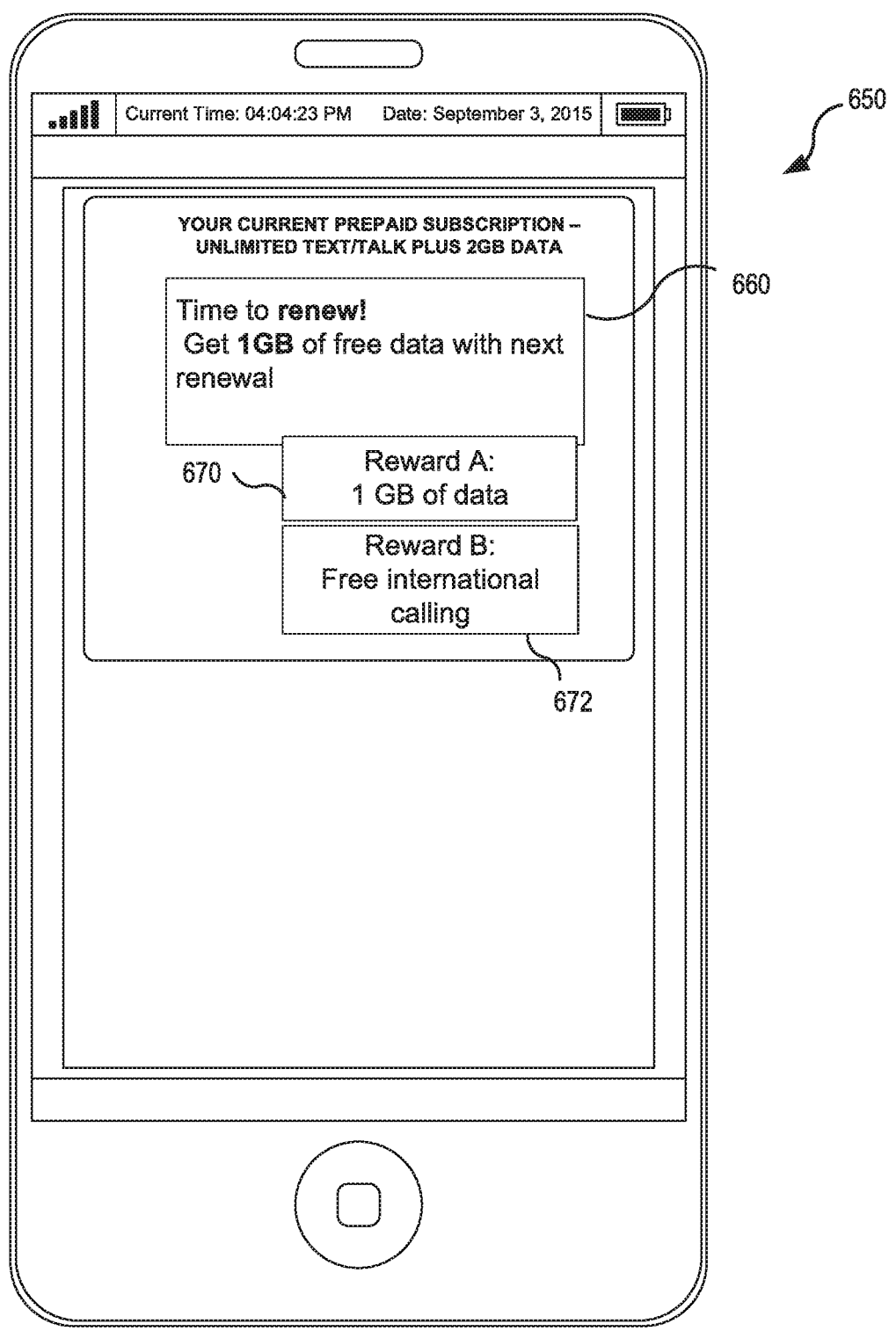

As another example, FIG. 6B shows an example display 650, where the customer incentive system 150, in response to a trigger or other determination, causes the mobile device 110 to display information 660 associated with a reward to be provided to the customer associated with the mobile device 110 in response to a renewal of a prepaid service plan, along with user-selectable display elements (e.g., "reward A" 670, "reward B" 672), that, when selected by the customer, facilitate the renewal of a current prepaid service plan, including a renewal reward (e.g., reward of additional data or international calling), chosen by the customer. Of course, the customer incentive system 150 may display other information to mobile device customers not depicted in the Figures.

Thus, in some embodiments, the customer incentive system 150 may perform various different methods and processes when determining whether to provide a prepaid customers with a renewal reward, what type of reward to provide to a customer, what amount of reward to provide to the customers, when and how frequent to provide a reward to a customer, and so on.

For example, the customer incentive system 150 may determine an amount of data to provide to a mobile device customer of a prepaid service plan in a future renewal period that is based on determining that the mobile device customer has performed a target number of renewals of a prepaid service plan under which telecommunication services are provided by a telecommunications carrier to a customer's mobile device, and updating a data bucket provided to the mobile device customer under the prepaid service plan with a reward amount of data, based on the target number of renewals of the prepaid service plan performed by the mobile device customer, where the target number of renewals may include at least one renewal of the prepaid service plan after at least one non-renewal of the prepaid service plan.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. §

112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method for use in a telecommunication network, the method comprising:
   receiving an indication of an occurrence of a renewal event at a mobile device associated with a mobile device user of the telecommunication network,
      wherein the renewal event corresponds to a prepaid wireless service plan for the mobile device user;
   determining within the telecommunication network that the mobile device has performed a pattern of activities via the telecommunication network that indicate the mobile device has used a certain amount of data via the telecommunication network and is predicted to maintain usage;
   incrementing a renewal event counter for the mobile device user in response to occurrences of a renewal event,
      wherein the renewal event counter for the mobile device user tracks a number of renewal events; and
      wherein a value of the renewal event counter is a total number of renewal events;
   providing an additional allocated data bucket to the mobile device,
      wherein the additional allocated data bucket is a predetermined gigabyte monthly data allocation;
      wherein the additional allocated data bucket is at least one of:
         a set integer amount of additional gigabytes of data,
         a certain additional percentage of gigabytes of data,
         unlimited use for certain mobile device applications used by the mobile user for streaming music,
         unlimited international calling, or
         unlimited additional messaging;
      wherein the additional allocated data bucket for the mobile device is increasable to a maximum amount, and,
      wherein the additional allocated data bucket is provided based on a value equal to an integer quotient of a total number of renewal events over a number of qualified renewal events (Q/N), multiplied by a predetermined amount (G) of data; and
   providing the additional allocated data bucket to the mobile device.

2. The method of claim 1, wherein the number of qualified renewal events is based on one or more biographical attributes assigned to the mobile device user.

3. The method of claim 1, wherein the number of qualified renewal events is based on attributes assigned to a group of users in which the mobile device user has been grouped.

4. The method of claim 1, wherein the number of qualified renewal events is based on historical renewal event activities of the mobile device user.

5. The method of claim 1, wherein the number of qualified renewal events is based on an analysis of renewal event activities over a predetermined time period for multiple mobile device users.

6. The method of claim 1, wherein the predetermined amount of the additional allocated data bucket is based on an analysis of renewal event activities over a predetermined time period for multiple mobile device users.

7. The method of claim 1, further comprising:
   identifying a historical time window within which the mobile device user performed the renewal event; and
   determining whether a current time corresponds to the historical time window; and
   upon determining that the current time corresponds to the historical time window, causing a user interface on the mobile device associated with the mobile device user to present information to the mobile device user about the additional allocated data bucket in response to a subsequent renewal event and allowing the mobile device user to accept the subsequent renewal event.

8. The method of claim 1, further comprising:
   identifying a portion of a month within which the mobile device user previously performed the renewal event;
   determining that a current time is within the portion of the month within which the mobile device user previously performed the renewal event, causing a graphical user interface on the mobile device associated with the mobile device user to present information to the mobile device user about the additional allocated data bucket in response to a subsequent renewal event and allowing the mobile device user to accent the subsequent renewal event.

9. The method of claim 1, further comprising:
   identifying a pattern of activities performed by the mobile device user that are associated with a likely renewal event;
   determining whether a recent pattern of activities matches the pattern of activities; and
   upon determining that the recent part pattern of activities matches the pattern of activities, causing a graphical user interface on the mobile device associated with the mobile device user to present information to the mobile device user about the additional allocated data bucket in response to a subsequent renewal event and allowing the mobile device user to accept the subsequent renewal event.

10. A system, comprising:
    at least one hardware server, coupled to a telecommunication network, wherein the server is configured to execute software modules, including:
       a renewal event module that accesses information associated with an occurrence of a renewal event at a mobile device of a mobile device user of the telecommunication network,
          wherein the renewal event corresponds to a prepaid wireless service plan for the mobile device user;
       a determination module configured for:
          determining within the telecommunication network that the mobile device has performed a pattern of activities via the telecommunication network that indicate the mobile device has used a certain amount of data via the telecommunication network and is predicted to maintain usage;
          incrementing a renewal event counter for the mobile device user in response to occurrences of a renewal event,
             wherein the renewal event counter for the mobile device user tracks a number of renewal events; and
             wherein a value of the renewal event counter is the total number of renewal events;
          providing an additional allocated data bucket to the mobile device,
             wherein the additional allocated data bucket is a predetermined gigabyte monthly data allocation;

wherein the additional allocated data bucket is at least one of:
a set integer amount of additional gigabytes of data,
a certain additional percentage of gigabytes of data,
unlimited use for certain mobile device applications used by the mobile user for streaming music,
unlimited international calling, or
unlimited additional messaging;
wherein the additional allocated data bucket for the mobile device is increasable to a maximum amount,
wherein the additional allocated data bucket is determined as a value equal to an integer quotient of a total number of renewal events over a number of qualified renewal events (Q/N), multiplied by a predetermined amount (G) of the additional allocated data bucket; and
a provision module that provides the additional allocated data bucket to the mobile device.

11. The system of claim 10, wherein the allocated data bucket provision module provides the additional allocated data bucket to the mobile device user during a subsequent renewal period associated with the renewal event.

12. The system of claim 10, wherein an amount of the additional allocated data bucket is based on an identified pattern of activities performed by the mobile device user that are associated with a likely renewal event.

13. The system of claim 10, wherein an amount of the additional allocated data bucket is based on an analysis of renewal event activities over a predetermined time period for multiple mobile device users of the telecommunication network.

14. A computer-readable storage medium whose contents, when executed by a computing device, cause the computing device to perform operations comprising:
receiving an indication of an occurrence of a renewal event at a mobile device associated with a mobile device user of a telecommunication network,
wherein the renewal event corresponds to prepaid wireless service plan for the mobile device user;
determining within the telecommunication network that the mobile device has performed a pattern of activities via the telecommunication network that indicate the mobile device has used a certain amount of data via the telecommunication network and is predicted to maintain usage;
incrementing a renewal event counter for the mobile device user in response to occurrences of a renewal event,
wherein the renewal event counter for the mobile device user tracks a number of renewal events; and
wherein a value of the renewal event counter is the total number of renewal events, and
providing an additional allocated data bucket to the mobile device,
wherein the additional allocated data bucket is a predetermined gigabyte monthly data allocation;
wherein the additional allocated data bucket is at least one of:
a set integer amount of additional gigabytes of data,
a certain additional percentage of gigabytes of data,
unlimited use for certain mobile device applications used by the mobile user for streaming music,
unlimited international calling, or
unlimited additional messaging;
wherein the additional allocated data bucket for the mobile device is increasable to a maximum amount,
wherein the additional allocated data bucket is determined as a value equal to an integer quotient of a total number of renewal events over a number of qualified renewal events (Q/N), multiplied by a predetermined amount (G) of data; and
providing the additional allocated data bucket to the mobile device.

15. The computer-readable storage medium of claim 14, wherein the number of qualified renewal events is based on one or more biographical attributes assigned to the mobile device user.

16. The computer-readable storage medium of claim 14, wherein the number of qualified renewal events is based on historical renewal event activities of the mobile device user.

17. The computer-readable storage medium of claim 14, the operations further comprising:
identifying a historical time window within which the mobile device user performed the renewal event; and
determining whether a current time corresponds to the historical time window; and
upon determining that the current time corresponds to the historical time window, causing a graphical user interface on the mobile device associated with the mobile device user to present information to the mobile device user about the additional allocated data bucket in response to a subsequent renewal event and allowing the mobile device user to accept the subsequent renewal event.

* * * * *